Figure 1:
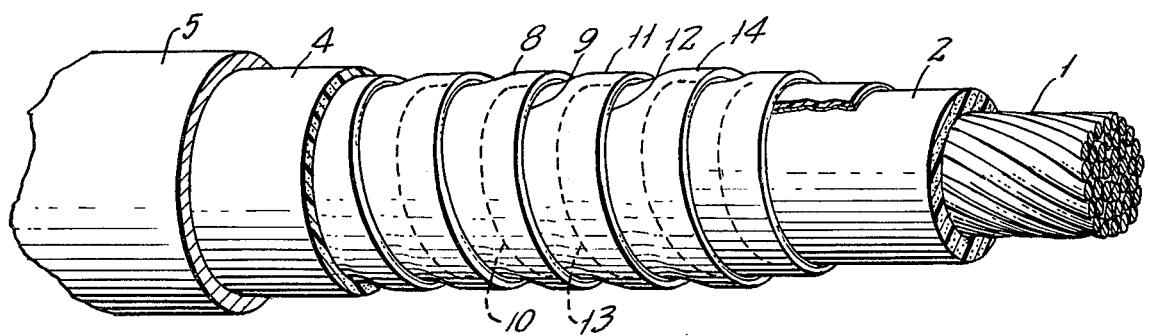

United States Patent [19]

Vecellio

[11] Patent Number: 4,481,259
[45] Date of Patent: Nov. 6, 1984

[54] ELECTRIC CABLE WITH INSULATION OF BIAXIALLY ORIENTED, POLYMERIC TAPE WITH A COATING OF GREASE

[75] Inventor: Bernardino Vecellio, Milan, Italy

[73] Assignee: Societa Cavi Pirelli S.p.A., Milan, Italy

[21] Appl. No.: 539,627

[22] Filed: Oct. 6, 1983

Related U.S. Application Data

[63] Continuation of Ser. No. 347,646, Feb. 10, 1982, abandoned.

[30] Foreign Application Priority Data

Feb. 18, 1981 [IT] Italy .............................. 19819 A/81

[51] Int. Cl.³ ...................... B32B 15/00; B32B 25/20; H01B 9/02
[52] U.S. Cl. ................................. 428/377; 174/23 C; 174/102 SC; 174/120 SC; 428/335; 428/336; 428/391; 428/447; 428/451
[58] Field of Search ............... 428/375, 377, 391, 383, 428/451, 379, 447, 335, 336; 174/110 SR, 110 PM, 23 C, 25 R, 120 C, 120 SC, 102 SC, 120 SR; 156/48, 53, 54

[56] References Cited

U.S. PATENT DOCUMENTS

| | | | |
|---|---|---|---|
| 2,428,608 | 10/1947 | Bass | 174/110 S |
| 3,108,153 | 10/1963 | Feick et al. | 174/25 F |
| 3,229,024 | 1/1966 | Kang | 174/25 R |
| 3,297,819 | 1/1967 | Wetmore | 156/48 X |
| 3,450,968 | 6/1969 | Cox | 174/25 R |
| 3,775,549 | 11/1973 | Matsuda et al. | 174/25 R |
| 3,888,710 | 10/1975 | Burk | 156/48 |
| 3,928,705 | 12/1975 | Loft et al. | 174/25 R |
| 4,163,082 | 7/1979 | Romenesko | 428/451 X |

FOREIGN PATENT DOCUMENTS 48-31435  9/1973  Japan .............................. 174/23 C Primary Examiner—Lorraine T. Kendell
Attorney, Agent, or Firm—Brooks, Haidt, Haffner & Delahunty

[57] ABSTRACT

A direct current electric cable has its conductor insulation formed by winding a tape of a biaxially oriented polymer provided on at least one face with a film of water-repellent grease.

8 Claims, 2 Drawing Figures

ELECTRIC CABLE WITH INSULATION OF BIAXIALLY ORIENTED, POLYMERIC TAPE WITH A COATING OF GREASE

This application is a continuation of application Ser. No. 347,646, filed Feb. 10, 1982, now abandoned.

The present invention relates to an electric cable and in particular to a direct current electric cable that is especially suited for being utilized as a submarine cable. The present invention also relates to a particular insulating material for electric cables, in particular, for direct current cables especially suited for submarine cables.

In the field of electric cables, and in particular for submarine cables, the most serious problem appears when, for some reason or other, there is formed any slit, fissure or such like, or there is a rupture, in the covering sheath of a cable because the presence of said opening allows water to enter into the cable. Such water can cause a perforation in the insulation and hence, can render the cable unusable.

It is practically impossible to prevent any slits, or even small cracks, from appearing, with the passage of time, in the sheaths of cables generally used, and in particular, in the sheath of a submarine cable, and hence, it is practically impossible to prevent the infiltration of water through the sheath of the cable itself.

In the known types of electric cables, the existence of even small cracks in the sheath which allow water to penetrate into the cable inevitably result in a consequent infiltration of water inside the cable insulation and the consequent breakdown of the cable, which requires, as a result, that necessary repairs carried out, which, in the case of submarine cables, are very difficult.

One object of the present invention is to prevent, or impede, the penetration of any water into the cable insulation, which would cause the cable to become unusable, even when slits or fissures should form in the covering sheath of the cable.

The object of the present invention is attained with an electric cable comprising a conductor and an insulation formed by winding at least one tape of a polymer biaxially oriented, at least one surface of the tape being covered by a film of water-repellent grease.

A further object of the present invention is an insulating material for electric cables, comprising a biaxially oriented polymer tape, covered on one surface, with a film of water-repellent grease.

Figure 2:
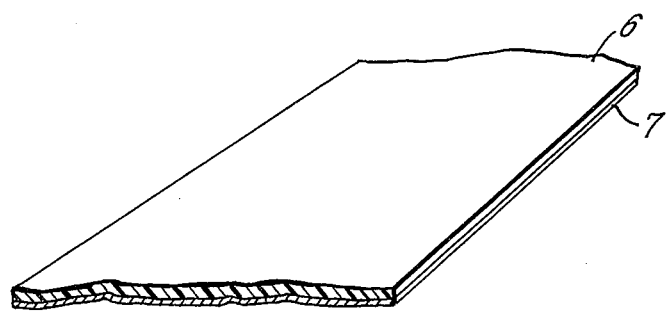

Other objects and advantages of the present invention will be apparent from the following detailed description of the presently preferred embodiments thereof, which description should be considered in conjunction with the accompanying drawings in which:

FIG. 1 is a perspective view of a cable, made in accordance with the invention, and FIG. 2 is an enlarged perspective view of a length of the tape employed as the insulation in the cable shown in FIG. 1.

An electric cable according to the present invention, is illustrated in FIG. 1. As can be seen in FIG. 1, the electric cable comprises an electric conductor 1, formed, for example, by a plurality of wires (for example: of copper) stranded together.

Around the electric conductor 1, there is disposed a semi-conductive layer 2. Around the semi-conductive layer 2, there is disposed a multi-layered insulation 3, which will be described hereinafter in detail, over which there is superimposed a semiconductive layer 4.

The previously described assembly, is enclosed within an impermeable sheath 5 usually constituted of lead or of aluminium.

The principal element of an electric cable according to the present invention is the particular type of multi-layered or stratified insulation 3, which is used. The stratified insulation 3 comprises at least one tape 6 (see FIG. 2) of a polymer biaxially oriented wound around the layer 2 and covered, on one surface, by a film 7 of a water-repellent grease.

By the term "polymer biaxially oriented" is meant an isotactic homopolymer corresponding to the following general formula: $(-CH_2-CHR)_n$ where R is chosen from the following radicals:

$H; CH_3; CH_2-CH_3; CH_2-CH_2; CH_2-CH_2-CH_3;$

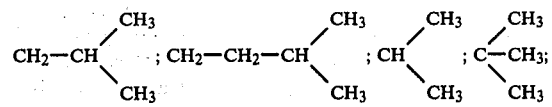

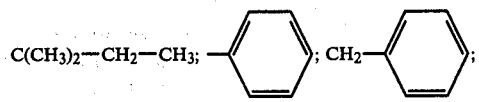

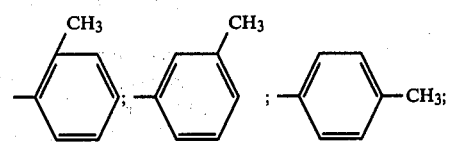

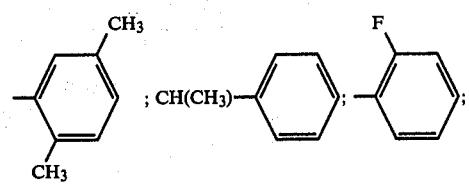

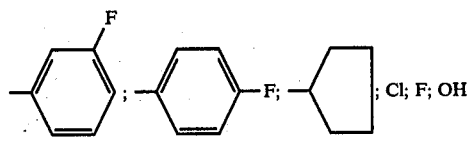

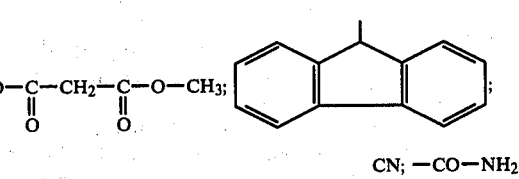

$CN; -CO-NH_2.$

From amongst all the polymers given hereinabove, that which is particularly desirable is an isotactic polypropylene, and more particularly, the isotactic polypropylene having the following chemical-physical characteristics:

(1) the molecular weight is between 200,000 and 900,000;

(2) the percentage of crystallinity is between 40% and 90%;

(3) the index of poly-molecularity is between 2 and 10; and (4) the modulus of elasticity is between 1740 and 4500N/mm$^2$.

As a water-repellent grease suited for the formation of the film on at least one surface of the biaxially oriented polymer tape, a particularly suitable grease is a water-repellent grease that does not damage or swell the material forming the tape 6. A grease having this characteristic for all the above-mentioned materials for the formation of the tape 6, is a grease based on silicones, and, in particular, a grease containing silicones having a viscosity at 25° C. of not lower than 100 centistokes.

As previously stated, the multilayered insulation 3 is formed by winding an insulating material, which, in itself, also forms the object of the present invention, which comprises a tape 6 provided on one of its surfaces with a film 7 of water-repellent grease.

In the particular embodiment illustrated in FIG. 1, several windings of tapes 6, specifically, an isotactic polypropylene having the chemical-physical characteristics previously given and covered, at least on one of their surfaces, with a film 7 of a grease based on silicones (containing silicones having a viscosity at 25° C. of not lower than 100 cSt), are superimposed one over the other until they all form a tubular insulation 3 having a thickness appropriate for forming the insulation of an electric cable.

More particularly, the silicone-based grease, i.e. the grease containing silicones having a viscosity at 25° C. not lower than 100 cSt, may contain, as silicones, polydimethylsiloxane having at 25° C. a viscosity not lower than 100 cSt.

Each winding of the tape 6 is disposed in such a way that each turn is overlapped by an edge portion over the turn that proceeds it as is shown in FIG. 1. In fact, as may be seen in FIG. 1, the turn 8 has its edge portion 9 overlapping the edge portion 10 of the turn 11, and the edge portion 12 of the turn 11 overlaps the edge portion 13 of the turn 14.

Moreover, the winding of each tape 6, provided with the film 7 of water-repellent grease, is disposed on the cable in such a way that the tape 6 is stretched and the tensioning of the tape 6 preferably is not less than 4N/mm$^2$, but not greater than the elastic limit of the tape 6 itself.

Another characteristic of the tape 6 is that preferably it has a thickness between 10 and 50 microns, and most preferably, a thickness between 10 and 25 microns. The thickness of the film 7 of silicone-based grease having a viscosity at 25° C. not lower than 100 cSt, is between 1% and 50% of the thickness of tape 6.

If the tape 6 is coated on only one side with the grease 7, the side coated with the grease 7 may face toward or away from the conductor 1.

An electric cable, and in particular a d.c. electric cable having an insulation according to the present invention, provides for achieving the proposed objects of the invention and moreover, it is possible to utilize voltages as high as at least 400 kV. In fact, because of the presence of the film 7 of water-repellent grease, constituted by a grease based on silicones inbetween the various turns of tape 6 which, a a whole, form the multi-layered insulation 3 of the electric conductor 1, an insulation 3 is obtained which is impermeable to water, both in the radial direction of the multi-layered insulation 3 itself and in the longitudinal direction of the insulation 3.

It results from this, that even if cracks should be formed in the sheaths through which water penetrates into the sheath interior, said water, due to the presence of the film 7 of grease based on silicones on at least one surface of the tape 6 by which the multi-layered insulation 3 is formed, cannot infiltrate inbetween the turns, either in the radial or in the longitudinal direction of the cable.

Moreover, any water which eventually penetrates the fissures of the sheath 5 cannot penetrate either in the radial direction or in the longitudinal direction of the cable, by moving inside of the tape 6, since the latter is impermeable and non-porous and the water-repellent grease prevents filtration between the turns.

What is more, in correspondence of the zone where an overlapping of the various turns of the tape 6 take place and where, during the winding of the tape, small interspaces can be formed entrapping minute quantities of gas, particularly air, these interspaces are filled up, probably totally, with the material that constitutes the film 7 of water-repellent grease, and hence, any possible way for the water to pass along the multi-layered insulation 3 of the cable is eliminated as a practical matter.

Moreover, especially whenever polypropylene, a material which shrinks under the effects of heat, is used for tape 6 and the multi-layered insulation 3 is subjected to heat after it has been applied to the conductor 1, there is a considerable pressure exercised between the zones of overlapping for the adjacent turns of the tape 6. Such pressure reduces the dimensions of said interspaces thereby further guaranteeing that there are no pathways for the water to migrate along the insulating layer 3 of the cable. Moreover, regarding the capacity of the cable insulation to allow the use of operating voltages which are over 400 kV, this is due to the excellent dielectric characteristics of the insulating layer 3 of the cable, to the insulating material that goes to constitute this layer 3, i.e. to the material of the tape 6, and to the "grease-based-on-silicones" film 7 on at least one surface of said tape 6.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A direct current, electric, power cable comprising a cable core comprising a conductor with insulation therearound and coaxial therewith and a sheath enclosing said insulation, said insulation comprising a plurality of layers of tape wound around the conductor with the turns of tape of one layer overlapping the turns of tape of the next adjacent layer, said insulation being impermeable to water in both the radial and longitudinal direction of the insulation and said tape being made of a biaxially oriented polymeric material having a coating on at least one surface thereof of a water-repellent, viscous grease which prevents infiltration of water between the turns and which does not adversely affect the properties of or swell the tape and said coating being present between the surfaces of overlapping turns of the tape to provide a water repellent film of said grease between adjacent turns of the tape which fills any spaces between the turns whereby any water which may penetrate into the interior of the sheath is prevented by the coating from infiltrating between the tape turns and migrating longitudinally of the insulation.

2. An electric cable as set forth in claim 1 wherein said grease is a grease based on silicones.

3. An electric cable as set forth in claim 2 wherein said grease has a viscosity of at least 100 centistokes at 25° Centigrade.

4. An electric cable as set forth in claim 3 wherein said grease is polydimethylsiloxane.

5. An electric cable as set forth in claim 1, 2, 3 or 4 wherein said tape has a thickness from about 10 microns to about 50 microns and said coating has a thickness from about 1% to about 50% of the thickness of said tape.

6. An electric cable as set forth in claim 1, 2, 3 or 4 wherein said tape has a thickness from about 10 microns to about 25 microns and said coating has a thickness from about 1% to about 50% of the thickness of said tape.

7. An electric cable as set forth in claim 1, 2, 3 or 4 wherein said polymeric material is isotactic polypropylene having a percentage of crystallinity from about 40% to about 90%, a molecular weight from about 200,000 to about 900,000, a polymolecular index from about 2 to about 10, a modulus of elasticity from about 1740 to about 4500N/mm² and a winding tension at least equal to 4N/mm².

8. An electric cable as set forth in claim 1 wherein said polymeric material is an isotactic homopolymer having the general formula (—CH₂—CHR)$_n$ wherein R is selected from the radical group consisting of:

H; CH₃; CH₂—CH₃; CH₂=CH₂; CH₂—CH₂—CH₃;

-continued $$CH_2-CH\begin{subarray}{l}CH_3\\CH_3\end{subarray}; CH_2-CH_2-CH\begin{subarray}{l}CH_3\\CH_3\end{subarray}; CH\begin{subarray}{l}CH_3\\CH_3\end{subarray}; C\begin{subarray}{l}CH_3\\CH_3\end{subarray}-CH_3;$$

C(CH₃)₂—CH₂—CH₃; ; CH₂ ;

; Cl; F; OH;

O—C—CH₂—C—O—CH₃; ;
‖    ‖
O    O

CN; —CO—NH₂.

* * * * *